UNITED STATES PATENT OFFICE.

WILLIAM FREUDENAU, OF ST. LOUIS, MISSOURI.

PROCESS FOR TREATING CORN, &c., IN THE MANUFACTURE OF FLOUR AND MEAL.

Specification forming part of Letters Patent No. 90,253, dated May 18, 1869.

*To whom it may concern:*

Be it known that I, WILLIAM FREUDENAU, of St. Louis, in the county of St. Louis and State of Missouri, have invented a certain new and Improved Method of Treating Corn and Indian Maize in the Manufacture of Corn Flour, Meal, &c.; and I hereby declare the following to be a full, clear, and exact description of the same.

The object I have in view is the manufacture of corn flour, meal, and like products, which, while not subjected to the kiln-drying process—a process which is essential to the preservation of meals prepared in the ordinary manner—will possess all the excellences of an article which has undergone such process, and will at the same time be better and more agreeable to consumers.

The kiln-drying is resorted to in order to destroy the soft or germinating part of the corn, which would otherwise decompose and spoil the meal; but the meal is often injured during this process, and has imparted to it a disagreeable taste, which is very objectionable.

The end I have in view, therefore, is to remove entirely this portion of the corn from the other parts before the manufacture of the flour, meal, &c., and this result I have attained by first cracking the corn, so as to open the grains and expose the germ, and then subjecting it to the action of a fan, or equivalent apparatus, so as to carry off and remove entirely the germinating parts, the remainder of the process being conducted in any desired manner. I prefer, however, after regrinding the grain when separated from the germ, to pass it through bolting-cloths of various sizes, so as to produce three or four distinct products, such as corn-flour, granulated corn-meal, corn-grits, &c.

While many variations may be made in carrying the above-specified invention into effect, yet I find that the following is, perhaps, productive of the best results.

The corn is first scoured and cleaned in the same manner that wheat is, or by passing it over vibrating riddles or sieves, and is then subjected to the action of ordinary suction-fans. It is next passed through a small burr, which cracks it and exposes the germ or soft part of the grain, and the whole is then run into a fan or a similar apparatus well known to those skilled in the art to which this invention pertains, which will draw out all the light stuff—that is to say, the soft or germinating part of the corn, part of the bran, and other impurities—and will run off the same as offal or refuse. The clean, cracked corn thus freed from the germ is reground on an ordinary burr, and is then run first over a fine silk bolting-cloth, say No. 10, coarser or finer, which lets through the corn-flour; secondly, over a bolting-cloth of more open texture, No. 00, coarser or finer, which lets through the corn-meal perfectly granulated. The balance of the corn which has not passed through the cloth can be run into the offal or refuse, or wire-cloth can be put on after the cloth which bolts the corn-meal, so as to let through the corn-grits, and the remainder can be used for offal.

The corn-flour made in this manner will keep well preserved, and can be used to mix with the lower grade of wheat-flour. It may also be employed to advantage by starch-manufacturers, by bakers, by candy-makers, in lieu of ground starch, or by families, for all purposes for which corn-starch is used.

The corn-meal made, as above described, from sound corn will keep as long as kiln-dried meal without spoiling, and is a far superior article for consumption to any made in the ordinary manner.

From the foregoing it will be apparent that the advantages thus attained in the manufacture of the flour, meal, &c., result from the fact that the germ is separated and removed from the grain before the corn is ground, and it is obvious that this result may be accomplished in various ways. I do not, therefore, limit myself to the precise details herein described; but

What I claim, and desire to secure by Letters Patent, is—

The method of treating corn or Indian maize in the manufacture of corn flour, meal, &c., by separating and removing the germ from the grain before the corn is ground, substantially as and for the purposes herein set forth.

In testimony whereof I have signed my name to this specification before two subscribing witnesses.

WM. FREUDENAU.

Witnesses:
L. WELLEROTH,
WM. KOMBRINK.